US008281283B2

(12) United States Patent
Speth et al.

(10) Patent No.: US 8,281,283 B2
(45) Date of Patent: Oct. 2, 2012

(54) MODEL-BASED INTEGRATION OF BUSINESS LOGIC IMPLEMENTED IN ENTERPRISE JAVABEANS INTO A UI FRAMEWORK

(75) Inventors: Florian Speth, Leimen (DE); Lothar Bender, Rauenberg (DE); Christian Loos, Wiesloch (DE); Dhawal Joshi, Bangalore (IN); Nidhi Rajshree, Uttar Pradesh (IN); Vesselin Mitrov, Sofia (BG); Georgi Gerginov, Sofia (BG); Aleksandrina Ivanova, Sofia (BG)

(73) Assignee: SAP AG, Walldorf (DE)

( * ) Notice: Subject to any disclaimer, the term of this patent is extended or adjusted under 35 U.S.C. 154(b) by 1029 days.

(21) Appl. No.: 11/855,102

(22) Filed: Sep. 13, 2007

(65) Prior Publication Data
US 2009/0077119 A1    Mar. 19, 2009

(51) Int. Cl.
G06F 9/44    (2006.01)

(52) U.S. Cl. .......................... 717/108; 717/107; 717/120

(58) Field of Classification Search .......................... None
See application file for complete search history.

(56) References Cited

U.S. PATENT DOCUMENTS

| 5,872,973 | A | * | 2/1999 | Mitchell et al. | 717/108 |
| 5,987,247 | A | * | 11/1999 | Lau | 717/108 |
| 6,044,217 | A | * | 3/2000 | Brealey et al. | 717/107 |
| 6,237,135 | B1 | * | 5/2001 | Timbol | 717/107 |
| 6,859,919 | B1 | * | 2/2005 | Deffler et al. | 717/108 |
| 7,093,264 | B2 | * | 8/2006 | Choi et al. | 719/316 |
| 7,367,014 | B2 | * | 4/2008 | Griffin | 717/107 |
| 7,386,835 | B1 | * | 6/2008 | Desai et al. | 717/107 |
| 7,412,689 | B1 | * | 8/2008 | Quinn et al. | 717/107 |
| 7,434,203 | B2 | * | 10/2008 | Stienhans et al. | 717/120 |
| 7,448,045 | B1 | * | 11/2008 | Lu et al. | 717/108 |
| 7,469,402 | B2 | * | 12/2008 | Bender et al. | 717/120 |
| 7,493,594 | B2 | * | 2/2009 | Shenfield et al. | 717/107 |
| 7,581,205 | B1 | * | 8/2009 | Massoudi | 717/107 |
| 7,606,820 | B2 | * | 10/2009 | Stienhans et al. | 717/120 |
| 7,657,868 | B2 | * | 2/2010 | Shenfield et al. | 717/107 |
| 7,676,787 | B2 | * | 3/2010 | Pepin | 717/107 |
| 7,721,219 | B2 | * | 5/2010 | Harsh et al. | 715/762 |
| 7,721,259 | B2 | * | 5/2010 | Heinke et al. | 717/120 |
| 7,831,625 | B2 | * | 11/2010 | Bloesch | 707/796 |
| 7,895,566 | B2 | * | 2/2011 | Shenfield et al. | 717/120 |
| 8,069,437 | B2 | * | 11/2011 | Aigner et al. | 717/120 |
| 2008/0222600 | A1 | * | 9/2008 | Choi et al. | 717/107 |

OTHER PUBLICATIONS

Branko Milosavljevic, et al., "User Interface Code Generation for EJB-Based Data Models Using Intermediate Form Representations", Jun. 2003, PPPJ 2003, pp. 125-128.*
Mira Mezini, et al., "Adaptive Plug-and-Play Componnets for Evolutionary Software Development", Oct. 1998, pp. 97-116.*

(Continued)

Primary Examiner — Thuy Dao
Assistant Examiner — Xi D Chen
(74) Attorney, Agent, or Firm — Mintz, Levin, Cohn, Ferris, Glovsky & Popeo, P.C.

(57) ABSTRACT

A system and method for integrating business logic implemented in Enterprise JavaBeans (EJBs) into a user interface framework are disclosed. A design-time environment includes an analyzer that analyzes selected EJBs and generates a model representation of the selected EJBs, and further includes a metadata provider to provide additional metadata to the model representation. A runtime environment has a generic model component to access the selected EJBs based on their model representation, and executes the selected EJBs in the user interface framework.

13 Claims, 4 Drawing Sheets

OTHER PUBLICATIONS

Pietschmann, et al., "Application Composition at the Presentation Layer: Alternatives and Open Issues", 2010 ACM; [retrieved on May 18, 2012]; Retrieved from Internet <URL:http://dl.acm.org/citation.cfm?id=1967486.1967558>; pp. 461-468.*

Vermeulen, et al., "Service-interaction Descriptions: Augmenting Services with User Interface Models", 2008, International Federation for Information Processing; [retrieved on May 18, 2012]; Retrieved from Internet <URL:http://www.springerlink.com/content/ux175u8600538351/fulltextpdf>; pp. 447-464.*

Weilbach, Herger, "SAP xApps", 2005, SAP PRESS; [retrieved on May 17, 2012]; Retrieved from Internet <URL:http://cdn.ttgtmedia.com/searchSAP/downloads/chapter-january.pdf>; pp. 1-38.*

Yang, et al., "A Model-Oriented Dynamic Architecture and Its Supporting System", 2006, International Journal of Computer Science and Network Security; [retrieved on May 17, 2012]; Retrieved from Internet <URL:http://paper.ijcsns.org/07_book/200612/200612B19.pdf>; pp. 304-310.*

* cited by examiner

MODEL-BASED INTEGRATION OF BUSINESS LOGIC IMPLEMENTED IN ENTERPRISE JAVABEANS INTO A UI FRAMEWORK

BACKGROUND

This disclosure relates generally to user interface development tools, and more particularly to a model-based integration into a user interface (UI) framework of business logic implemented in Enterprise JavaBeans.

Programming models can be used to develop UIs and provide support when developing web-based business applications. One such programming model is SAP's Web Dynpro, a client-independent programming model of the SAP NetWeaver technology platform. The Web Dynpro model is based on the Model View Controller (MVC) paradigm: the model forms the interface to the back end system and thus enables the application access to data. The view also provides the representation of the data in the browser. The controller lies between the view and the model, and formats the model data to be displayed in the view, processes the user entries made by the user, and returns them to the model.

Each programming model features a clear separation of business logic and display logic, and utilizes a uniform metamodel for all types of user interfaces. Further, UIs developed in such an environment can be executed on any of a number of client platforms. To create an application, a set of tools are used to describe the properties and functions of the application. The data created in this way is stored in tables as metadata. Later, the necessary source code, which is executed at runtime, is created from this metadata. Therefore, the metadata itself is independent of the rendering technique used at runtime.

Enterprise JavaBeans (EJB) are the server-side component architecture for the Java Platform, Enterprise Edition (Java EE). Java is a programming language designed for use in distributed environments of the Internet. Java is based on the "look and feel" of the C++ language, but it simpler and more of an object-oriented programming model. Java can be used to create complete applications that run on a single computer, or that are distributed among servers and clients in a network.

Java EE is a computing platform designed for mainframe-scale computing of medium to large enterprises, and is designed to simplify application development in a thin client-tiered environment. Java EE simplifies application development and decreases the need for programming and programmer training by creating standardized, reusable modular components and by enabling many aspects of application programming automatically.

EJBs enable rapid and simplified development of distributed, transactional, secure and portable Java-based applications. Each EJB is an object-oriented programming interface for building re-useable applications or program building blocks, called components, that can be deployed in a network on any major operating system platform. EJBs can be used to give web pages (or other applications) interactive capabilities, such as computing interest rates or varying page content based on user or browser characteristics, for example.

Currently there is no suitable tool to support the usage of EJBs inside a UI component such as WebDynpro. A developer now has to write all the "glue" code required for invoking business methods on an EJB, and binding the data to the programming model component. There is also no mechanism for metadata provisioning and dynamic access of EJB components at runtime.

SUMMARY

In general, this document discusses a system and method for model-based integration of business logic implemented in EJBs into a UI framework. A dedicated model-based integration of EJBs and a programming model such as Web Dynpro includes an analyzer and importer component, code generation facilities, a generic runtime component and a metadata retrieval mechanism.

In one aspect, a method for using EJBs in a user interface component of an application includes computer-executed steps of generating a model representation of one or more EJBs, storing the model representation of each of the one or more EJBs with additional metadata, and during runtime of the application, accessing the one or more EJBs in the user interface via a generic model component that accesses the model representation of each of the one or more EJBs.

In another aspect, a method includes computer-enabled steps of providing one or more EJBs to a developer and receiving, from the developer, an indication of selected EJBs from the one or more EJBs to be used in the user interface. The method further includes steps of generating a model representation of the selected EJBs, and storing the model representation of each of the one or more EJBs with additional metadata.

In yet another aspect, a system for integrating business logic implemented in Enterprise JavaBeans (EJBs) into a user interface framework includes a design-time environment having an analyzer that analyzes selected EJBs and generates a model representation of the selected EJBs, and a metadata provider to provide additional metadata to the model representation. The system further includes a runtime environment having a generic model component to access the selected EJBs based on their model representation, and executes the selected EJBs in the user interface framework.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a model-based integration system and method to support the usage of EJBs inside a user interface (UI) component, and to simplify the development process of EJB-based UIs. The system and method includes a model representation of an EJB component, which provides necessary information to a design time environment of a programming model such as SAP's Web Dynpro. In this way, the consumption of an EJB is as simple and intuitive as the consumption of other objects such as Web Services or Remote Function Calls (RFCs).

Figure 1:
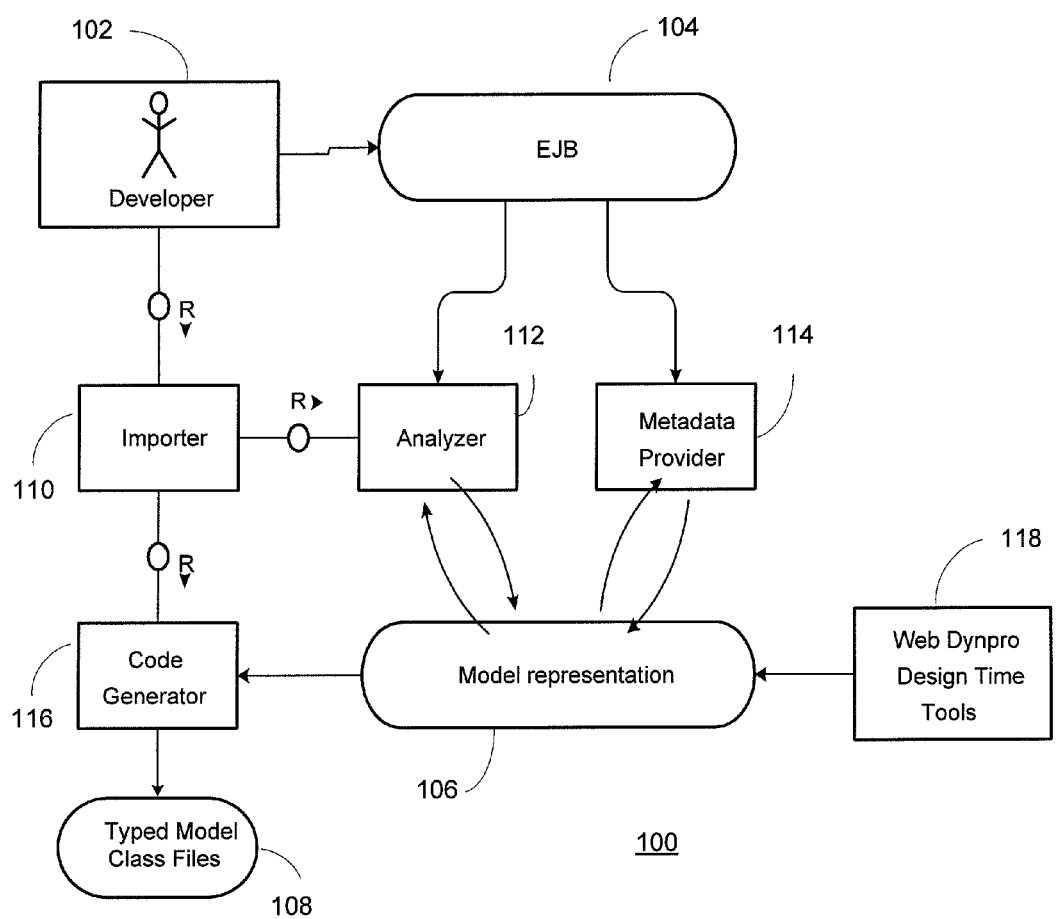
FIG. 1 illustrates a design-time environment for a programming model of a UI component.

The system and method for using EJBs inside a UI component includes two parts: design-time and runtime. FIG. 1 illustrates a design-time environment 100 of a programming model for an application that enables an application developer 102 to browse available EJBs 104, select those EJBs needed in the corresponding application, create a model representation 106 of each selected EJB 104 in order to declaratively bind the selected EJB 104 to the application's UI and generate typed model class files 108 to access the model from application code.

The design-time environment 100 includes an importer 110 that identifies and classifies EJBs based on inputs from the application developer 102, and analyzer 112 that looks at classes, operations, and parameters, and then stores this information as metadata for the model representation 106. A metadata provider 114 provides the metadata to the model representation 106. A code generator 116 generates Java code for the typed model class files 108 based on the model representation 106, which is primarily metadata. The design-time environment 100 also includes a set of design-time tools 118 that enable the developer 102 to generate the model representation 106.

Figure 2:
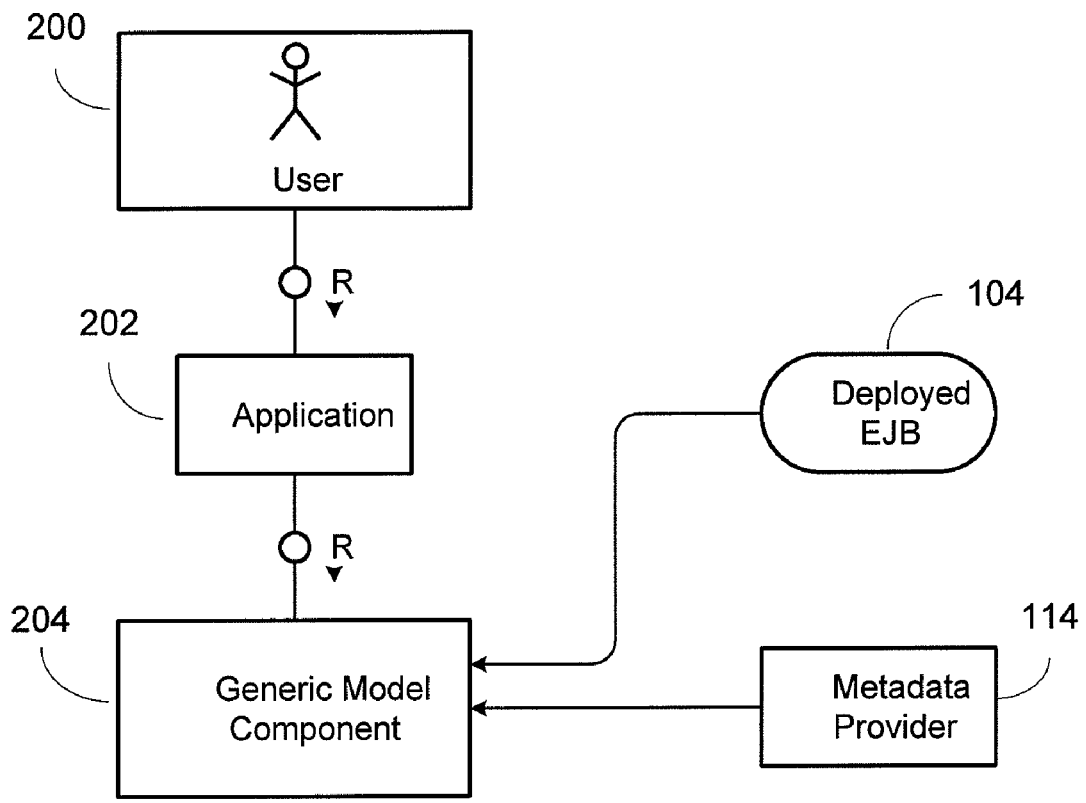
FIG. 2 illustrates a runtime environment for a programming model of a UI component.

FIG. 2 illustrates a runtime environment 200 for a programming model-oriented application 202 using an EJB-based UI. The runtime environment 200 allows the application 202, at an application server, to access an EJB 104, which has not been imported into the application 202 during design time. This is achieved through a generic model component 204, which provides dynamic access to the deployed EJB 104. The typed model class files 108 use the generic model component 204 to call the deployed EJB 104 at runtime. The generic model component 204 detects new fields and adds them to a table of metadata provided by the metadata provider 114, which provides adaptability, field labels, and field lengths for types used by the EJB 104. By using the generic model component 204, the application 202 can consume modified or extended EJBs 104 without the need to re-import or re-compile an EJB 104.

Figure 3:
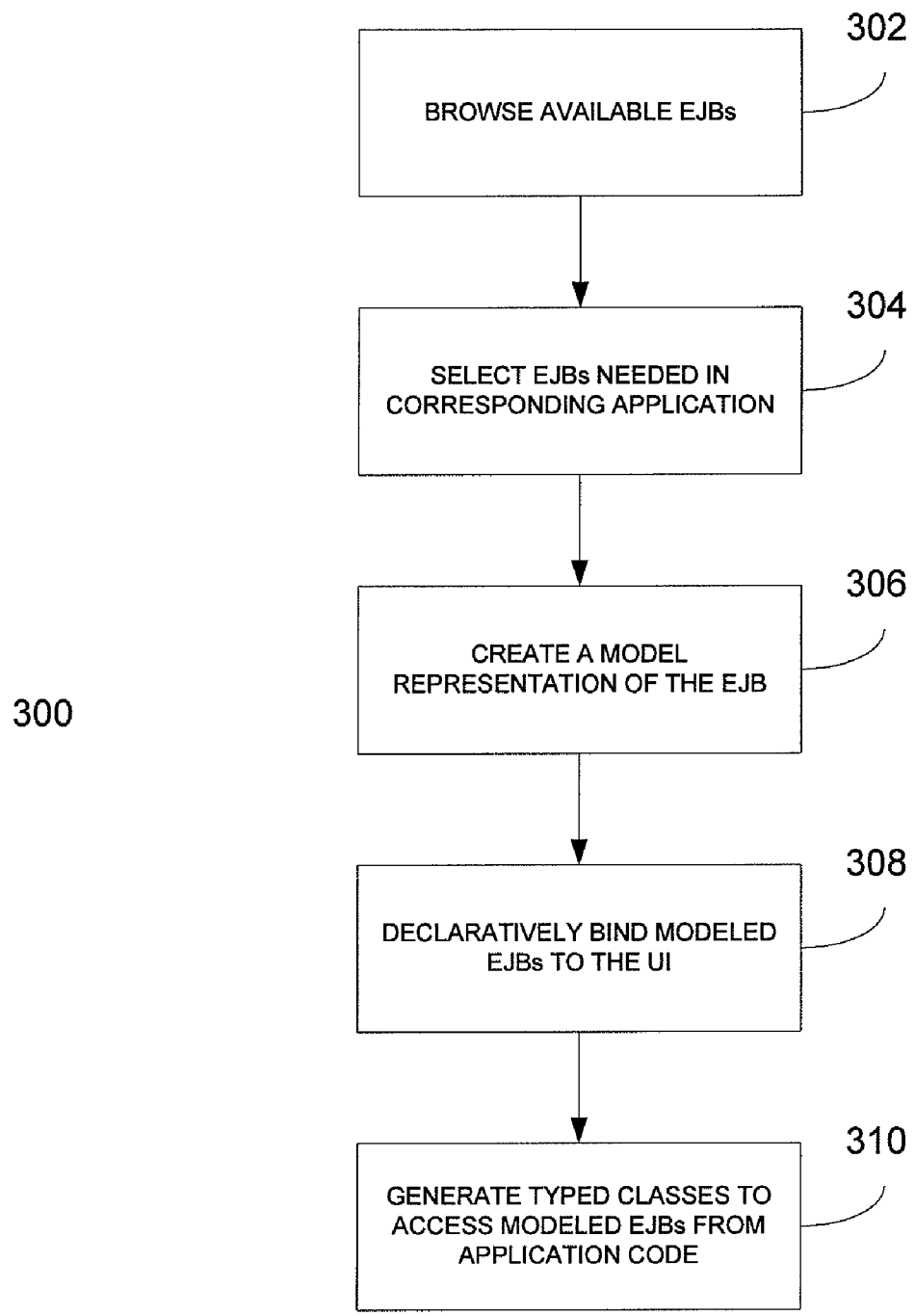
FIG. 3 is a flowchart of a method for integrating business logic implemented in EJBs into a UI framework.

FIG. 3 is a flowchart of a method 300 for integrating business logic implemented in EJBs into a UI framework. At 302, available EJBs are made available for browsing by an application developer. At 304, the EJBs needed in the application are selected. At 306, a model representation of the selected EJBs is created, and at 308 the modeled EJBs are declaratively bound to the UI of the application. At 310, typed classes are generated which provide access to the modeled EJBs from application code.

Figure 4:
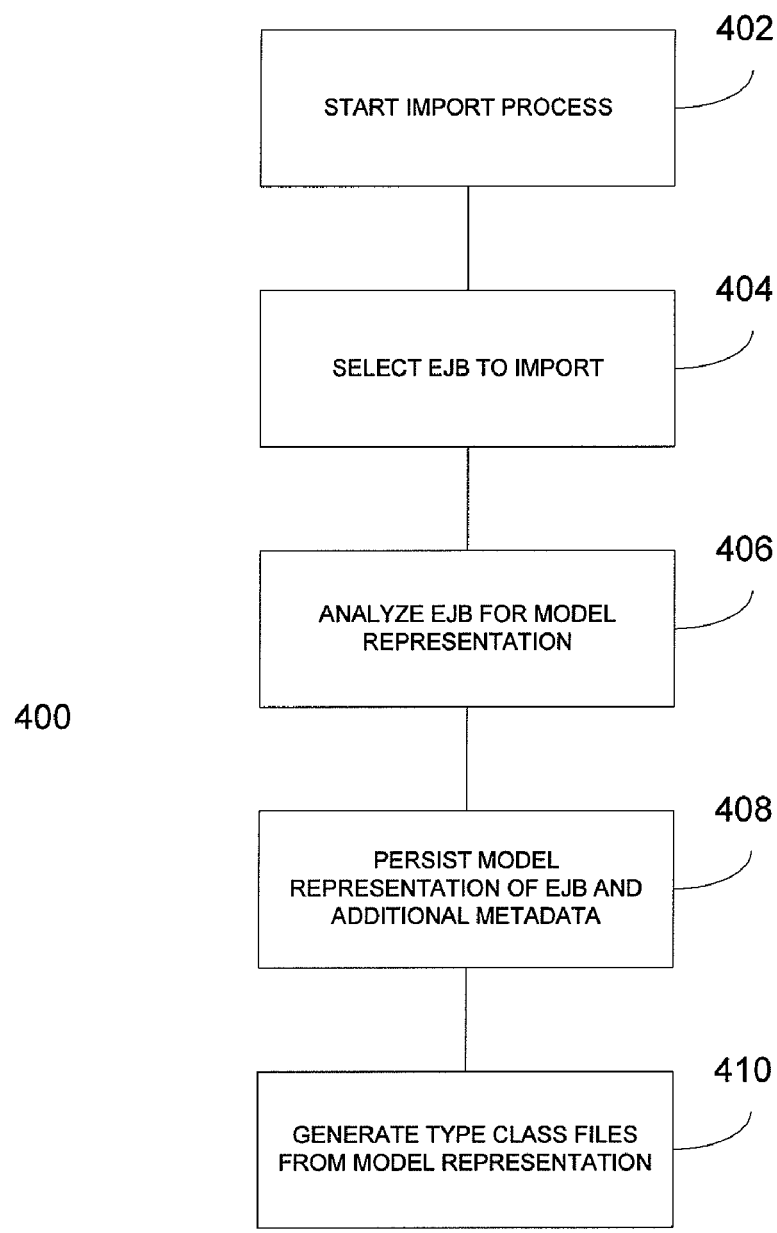
FIG. 4 is a flowchart of an EJB import process.

FIG. 4 is a flowchart of an EJB import process 400, which is executed as follows. At 402, the import process is started 402, typically be a set of EJBs being made available for browsing by an application developer, or by an input command from the application developer. At 404, an EJB is selected for being imported to the application, and at 406 the selected EJB is analyzed for a model representation. At 408, the model representation of the selected EJB is persisted, along with additional metadata of the modeled EJB. Beyond the EJB metadata, additional metadata about types and properties can be provided to the UI Layer. The additional metadata can include type constraints such as maximum field length, label texts (to be displayed in a online form or table view), and information about cardinality on associations to enable validation checks.

At 410, the typed model class files are generated from the model representation. The typed model class files use the generic model classes at runtime in order to call the desired set of EJB business methods. This solution can also be applied in the consumption of a service as provided by a Composite Application Framework (CAF) in a Web Dynpro component, and in the consumption of a CAF service in a Visual Composer environment.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method executed by one or more processors, the method comprising:

calling, during runtime by a model-oriented application at an application server, a first Enterprise JavaBean (EJB) that was imported into the model-oriented application at design time, the first EJB having a model representation that was created and persisted, along with additional metadata of the modeled EJB, at design time, the model representation of the EJB having been declaratively bound to a user interface of the application, and typed classes having been generated at design time to provide access to the modeled EJB from application code;

accessing, during runtime by the model-oriented application at an application server, a second EJB, the second EJB having been deployed but not imported into the model-oriented application during design time, the second EJB having been at least one of modified and extended relative to an originally imported EJB, a generic model component providing dynamic access to the second EJB during runtime;

detecting, by the generic model component at runtime, at least one new field of the second EJB, the at least one new field being added as part of the modification or extension to the second EJB;

adding, by the generic model component at runtime, the at least one new field to a table of metadata provided by a metadata provider, the metadata provider providing adaptability, field labels, and field lengths for types used by the second EJB; and consuming, by the model-oriented application at runtime, the second EJB without re- importing or re-compiling the second EJB.

2. A method in accordance with claim 1, wherein the model representation of the first EJB is generated in a design-time environment for the application.

3. A method in accordance with claim 1, wherein the additional metadata includes a maximum field length, label texts, and information about cardinality on associations to enable validation checks.

4. A method in accordance with claim 1, further comprising providing the first EJB for being browsed by a developer.

5. A method in accordance with claim 1, further comprising generating typed model class files based on generic model components for the first EJB.

6. A method in accordance with claim 5, wherein the typed model class files use the generic model component to access the first EJB.

7. A non-transitory computer readable medium embodying computer program instructions that, when executed by one or more processors, cause the one or more processors to perform operations comprising:

calling, during runtime by a model-oriented application at an application server, a first Enterprise JavaBean (EJB) that was imported into the model-oriented application at design time, the first EJB having a model representation that was created and persisted, along with additional metadata of the modeled EJB, at design time, the model representation of the EJB having been declaratively bound to a user interface of the application, and typed classes having been generated at design time to provide access to the modeled EJB from application code;

accessing, during runtime by the model-oriented application at an application server, a second EJB, the second EJB having been deployed but not imported into the model-oriented application during design time, the second EJB having been at least one of modified and extended relative to an originally imported EJB, a generic model component providing dynamic access to the second EJB during runtime;

detecting, by the generic model component at runtime, at least one new field of the second EJB, the at least one new field being added as part of the modification or extension to the second EJB;

adding, by the generic model component at runtime, the at least one new field to a table of metadata provided by a metadata provider, the metadata provider providing adaptability, field labels, and field lengths for types used by the second EJB; and consuming, by the model-oriented application at runtime, the second EJB without re-importing or re-compiling the second EJB.

8. A non-transitory computer readable medium in accordance with claim 7, wherein the additional metadata includes a maximum field length, label texts, and information about cardinality on associations to enable validation checks.

9. A non-transitory computer readable medium in accordance with claim 8, further comprising generating typed model class files based on the model representation of the first EJB.

10. A non-transitory computer readable medium in accordance with claim 7, wherein the typed classes use the generic model component to access the first EJB.

11. A non-transitory computer readable medium in accordance with claim 7, wherein the additional metadata refers to metadata other than EJB metadata, the additional metadata comprising type constraints including maximum field length, label texts that are displayed in an online form or table view, and information about cardinality on associations to enable validation checks.

12. A system comprising:
one or more processors; and
a non-transitory computer readable medium embodying computer program instructions that, when executed by the one or more processors, cause the one or more processors to perform operations comprising:

calling, during runtime by a model-oriented application at an application server, a first Enterprise JavaBean (EJB) that was imported into the model-oriented application at design time, the first EJB having a model representation that was created and persisted, along with additional metadata of the modeled EJB, at design time, the model representation of the EJB having been declaratively bound to a user interface of the application, and typed classes having been generated at design time to provide access to the modeled EJB from application code;

accessing, during runtime by the model-oriented application at an application server, a second EJB, the second EJB having been deployed but not imported into the model-oriented application during design time, the second EJB having been at least one of modified and extended relative to an originally imported EJB, a generic model component providing dynamic access to the second EJB during runtime;

detecting, by the generic model component at runtime, at least one new field of the second EJB, the at least one new field being added as part of the modification or extension to the second EJB;

adding, by the generic model component at runtime, the at least one new field to a table of metadata provided by a metadata provider, the metadata provider providing adaptability, field labels, and field lengths for types used by the second EJB; and consuming, by the model-oriented application at runtime, the second EJB without re- importing or re-compiling the second EJB.

13. A system in accordance with claim 12, wherein a design-time environment includes a code generator that generates typed model class files on top of the generic model components of the runtime environment.

* * * * *